(No Model.)
J. R. POSTEN.
VEHICLE HUB.
No. 251,794. Patented Jan. 3, 1882.
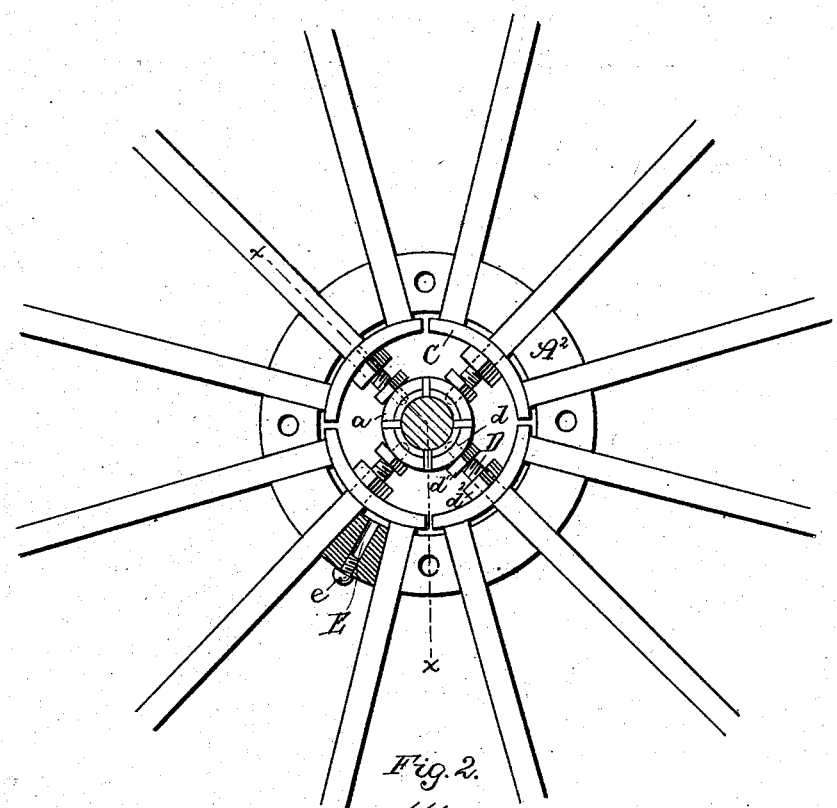
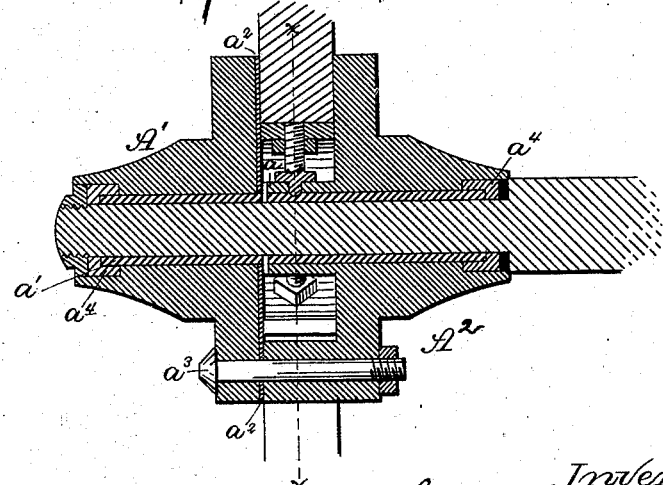
Witnesses:
J. W. Garner
W. S. D. Haines
Inventor:
John R. Posten
[signature]
his Attorney

UNITED STATES PATENT OFFICE.

JOHN R. POSTEN, OF PLEASANT CREEK, ASSIGNOR OF ONE-HALF TO EMORY L. RECTOR AND WILLIAM A. RECTOR, BOTH OF GRAFTON, W. VA.

VEHICLE-HUB.

SPECIFICATION forming part of Letters Patent No. 251,794, dated January 3, 1882.

Application filed November 21, 1881. (No model.)

*To all whom it may concern:*

Be it known that I, JOHN R. POSTEN, a citizen of the United States, residing at Pleasant Creek, in the county of Barbour and State of West Virginia, have invented certain new and useful Improvements in Vehicle-Hubs, of which the following is a specification, reference being had therein to the accompanying drawings.

My invention relates to vehicle-hubs; and it consists in the construction and arrangement of its several parts, as will be hereinafter more fully set forth.

In the drawings, Figure 1 is a side view with the front hub-plate removed, and Fig. 2 is a longitudinal section upon the line $x\ x$.

A is a hub consisting of the plates A', A². The plate A² has a square annular groove cut in its face, and has a central hole cut through it, around which projects the shoulder $a$ and through which is placed the hub-box $a'$, as shown. At equal distances around the periphery of the plate are cut mortises which receive the spokes. These mortises extend through into the groove and allow the ends of the spoke-tenons to project into it, as shown. The spokes are made without shoulders and are of the same thickness their entire length, as shown. The plate A' is provided with a washer, $a^2$, on its inner end. It fits snugly over the hub-box, and with its washer forms an air-tight union with the plate A² and the spokes. Upon both ends of the hub are placed brass boxes $a^4$, which can be removed when worn out and replaced by new ones. The plates are secured together by bolts $a^3$. In the annular groove are placed expansion-blocks C, which are curved to conform to the curvature of the outer side of the groove, and which press firmly against the bottoms of the spokes. Between the inner side of the blocks C and the annular shoulder $a$ are set-screws D. The screws are pivoted around the shoulder $a$ by pivot-pins $d$, and are provided with heads $d'$ and lock-nuts $d^2$, as shown. The outer ends of the screws operate in threaded holes through the blocks C, as shown, the lock-nuts $d^2$ acting to prevent the screws from slackening up and loosening the blocks.

E is an oil-hole cut through the plate A² into the annular groove, and is closed by the screw $e$. The oil fills the interior groove, which acts as a reservoir for it, and is let onto the axle-arm through grooves in the end of the shoulder $a$ and holes in the hub-box. The oil is prevented from escaping by the washer $a^2$, which forms an air-tight union between the spokes and the plates. As the tire of the wheel becomes loosened from constant wear by removing the plate A' and tightening up the screws D the expansion-blocks will be forced against the bottoms of the spokes and will press them outward, which operation expands the felly of the wheel tightly against the tire.

When it is necessary to replace a broken or worn out spoke the plate A' can be removed, the old spoke taken out, and a new one inserted. To do this the wheel need not be removed.

What I claim is—

1. A hub consisting of the plates A' A², the plate A² having an annular shoulder, $a$, formed around the hub-box, and adapted to receive the pivot-pin $d$ of the screws D, substantially as shown and described.

2. In a hub, the screws D, pivoted in the annular shoulder $a$ by the pivot-pins $d$, and provided with heads $d'$ and lock-nuts $d^2$, operating in combination with the expansion-blocks C and shoulder $a$, substantially as and for the purposes set forth.

3. The expansion-blocks C, curved to conform with the curvature of the groove, operating in combination with the screws D and the spokes, and adapted to keep the spokes pressed firmly outward, substantially as and for the purposes specified.

4. In a hub, the combination of the plates A' A², expansion-blocks C, screws D, and shoulder $a$ with the spokes, substantially as shown and described.

In testimony whereof I affix my signature in presence of two witnesses.

JOHN R. POSTEN.

Witnesses:
H. W. UPPERMAN,
W. J. OSGOOD.